(12) United States Patent
Edens et al.

(10) Patent No.: US 6,372,282 B1
(45) Date of Patent: Apr. 16, 2002

(54) METHOD FOR PRODUCING A PROTEIN HYDROLYSATE

(75) Inventors: Luppo Edens, Rotterdam; Paul Schuurhuizen, Delft; Arthur Louis Maria Simonetti, Den Hoorn, all of (NL)

(73) Assignee: DSM N.V. (NL)

( * ) Notice: Subject to any disclaimer, the term of this patent is extended or adjusted under 35 U.S.C. 154(b) by 0 days.

(21) Appl. No.: 09/331,467

(22) PCT Filed: Dec. 22, 1997

(86) PCT No.: PCT/EP97/07292

§ 371 Date: Jul. 9, 1999

§ 102(e) Date: Jul. 9, 1999

(87) PCT Pub. No.: WO98/27827

PCT Pub. Date: Jul. 2, 1998

(30) Foreign Application Priority Data

Dec. 23, 1996 (EP) .............................................. 96203621

(51) Int. Cl.$^7$ .............................. A23J 3/34; A23L 1/305
(52) U.S. Cl. ........................ 426/656; 514/343; 514/407; 435/68.1
(58) Field of Search ................................ 426/656, 634; 514/343, 407; 435/68.1

(56) References Cited

FOREIGN PATENT DOCUMENTS

WO  WO91/14772  10/1991

OTHER PUBLICATIONS

Breddam, K., Carboxypeptidaes S–1 From Penicillium Janthinellum: Enzymatic Properties In Hydrolysis And Aminolysis Reactions, CARLSBERG RES. COMMUN. (1988) 53:309–320.

Breddam, K. et al., Primary Structure And Enzymatic Properties Of Carboxypeptidase II From Wheat Bran, CARLSBERGE RES. COMMUN. (1987) 52:297–311.

Breddam, K., Series Carboxypeptidases. A Review. CARLSBERG RES. COMMUN. (1986) 51:83–128.

Motoshima, H. et al., Molecular Cloning And Nucleotide Sequence of the Aminopeptidase T Gene Of Thermus Aquaticus YT–1 And Its High–Level Expression In *Escherichia Coli*, AGRIC. BIOL. CHEM. (1990) 54(9):2385–2392.

Roncari, G. et al., Thermophilic Aminopeptidase I, METHODS IN ENZYMOLOGY (1976) 45:522–530.

Remmington, S.J. et al., Carboxypeptidase C and D, METHODS IN ENZYMOLOGY (1994) 244:231–238.

Stoll, E. et al., Aminopeptidase II From Bacillus Stearothermophilus, BIOCHIMICA ET BIOPHYSICA ACTA (1976) 438: 212–220.

*Primary Examiner*—Anthony J. Weier
(74) *Attorney, Agent, or Firm*—Morrison & Foerster LLP

(57) ABSTRACT

This invention relates to a process for obtaining enzymatically hydrolyzed proteinaceous material for human consumption. The process involves the use of essentially only one exopeptidase, in combination with one or more suitable endopeptidase, to obtain improved base characteristics and process economics under conditions which minimize microbial contamination.

24 Claims, No Drawings

METHOD FOR PRODUCING A PROTEIN HYDROLYSATE

The present invention relates to a method for preparing a protein hydrolysate, more specifically to an enzymatically prepared protein hydrolysate.

In the food industry protein hydrolysates may be used as food products or as additives to food products.

Conventionally, protein hydrolysates are produced chemically by hydrolysing protein or proteinaceous material, such as for example defatted soy flour or wheat gluten, with hydrochloric acid under refluxing conditions. The resulting hydrolysates are cheap and tasty. However, chemical hydrolysis also results in the formation of chlorohydrins, such as monochlorodihydroxypropanols (MCDPs) and dichloropropanols (DCPs), the presence of which is undesirable in food products.

Alternatively, protein or proteinaceous material may be hydrolysed enzymatically. First, the relevant protein source is subjected to a (partial) hydrolysis with one or more suitable endoproteases. Then, the resulting protein fragments can be degraded completely or partly into the individual amino acids or dipeptides or tripeptides by the use of exopeptidases. Two categories of exopeptidases are available:

(i) amino-terminal exopeptidases (which start to cleave-off amino-acids, dipeptides or tripeptides from the protein fragment's amino-terminal end);
(ii) carboxy-terminal exopeptidases (which start to cleave-off amino-acids or dipeptides from the protein fragment's carboxy-terminal end).

Small peptide fragments (i.e. proteins extensively pre-hydrolysed with a suitable endoprotease) provide the basis for rapid generation of amino acids.

To achieve maximum amino acid generation, commercial exopeptidase-rich preparations such as Flavourzyme® (NOVO Nordisk, Denmark) and various Sumizyme® preparations (Shin Nihon, Japan), contain a mixture of various endoproteases to create as many starting-points as possible for the different exopeptidases. Furthermore, these preparations contain different types of amino-terminal and carboxy-terminal exopeptidases to overcome the relatively high specificity towards particular amino acids sequences that most exopeptidases possess. As a result of their complex nature, these currently available endoprotease/exopeptidase mixtures are expensive and determine to a large extent the cost of the resulting hydrolysate. As various endoproteases are readily available as relatively pure and cost effective products, it is the complex mixture of exoproteases, which is considered essential, that is the cost determining factor. For example, WO94/25580 describes the use of at least five proteolytic components to provide a protein hydrolysate which is useful as a flavouring agent.

SUMMARY

The present invention relates to a method for preparing a protein hydrolysate. The method comprises contacting proteinaceous starting material, under aqueous conditions, with a proteolytic enzyme mixture which comprises only one exopeptidase. Cost-effective production of such single exopeptidase preparations may be feasible using well-documented cloning techniques.

In a preferred embodiment, the exopeptidase is a carboxypeptidase, more preferably a serine carboxypeptidase.

In another preferred embodiment, the exopeptidase is a heat-stable exopeptidase, more preferably a heat-stable aminopeptidase.

DETAILED DESCRIPTION

The present invention provides a method for preparing a protein hydrolysate which comprises contacting proteinaceous starting material, under aqueous conditions, with a proteolytic enzyme mixture which comprises only one exopeptidase. A proteolytic enzyme mixture according to the invention, i.e. comprising a single selected exopeptidase in combination with one or more endoproteases, may hydrolyse vegetable or animal protein at least as effectively as an enzyme mixture which contains several exoproteases. Since cost-effective production of such single exopeptidase preparations is feasible using well-documented cloning techniques, the method according to the invention enables the economic production of protein hydrolysates.

By only one exopeptidase is meant that at least 75% of the exopeptidase activity is derived from one enzyme. More preferably at least 90%, most preferably at least 95% of the exopeptidase activity is derived from one enzyme.

The exopeptidase preparations used in the present invention are preferably obtained using the cloned gene encoding the exopeptidase in a well producing gene expression system. Typically such expression systems provide for exopeptidase preparations in which at least 60%, preferably at least 75%, more preferably at least 85%, of the protein is represented by the expression product of the cloned gene.

Exopeptidases produced using these rDNA-techniques, that is cloning the gene encoding the exopeptidase in a host organism that overexpresses this gene, usually provide for enzyme preparations comprising less contaminating enzymatic activities and usually will not require costly recovery steps. Well known host organisms that overexpress cloned genes are fungi or bacteria for example Aspergillus, Trichoderma, *E. coli,* Bacillus etc.

Examples of protein or proteinaceous material which may be hydrolysed by the method of the invention are known to the person skilled in the art and include vegetable proteins such as soy protein, wheat gluten, rape seed protein, pea protein, alfalfa protein, sunflower protein, zein, and animal derived protein such as casein, egg white, whey protein and meat protein. As some vegetable proteins such as wheat gluten have low solubilities under the pH conditions used, chemically treated versions of such protein sources provide another interesting group of substrates. In a preferred embodiment of the invention, the proteinaceous material used is defatted soy flour or wheat gluten.

The method according to the invention may be used to prepare a hydrolysate which contains peptides, amino acids or both peptides and amino acids. These hydrolysates may be used conventionally, for example in several food applications, including applications in the bakery industry, e.g. for improving colour and flavour; the savoury industry, e.g. for the production of seasonings; the dairy industry, e.g. for cheese ripening; the meat industry, e.g. for taste enhancement, the brewery industry, e.g. for the production of a fermentable wort; the beverage industry, e.g. for supplementing beverages with amino acids or peptides. The person skilled in the art will understand that the method according the invention may be used in any application for which mixtures of several endoproteases and several exopeptidases are currently used to generate peptides or amino acids from proteins, be it to improve solubility, consistency, fermentability, liquefaction, colour, filterability, nutritional value, digestibility or flavour.

Either a carboxypeptidase or an aminopeptidase may be used as the single exoprotease present.

If a carboxypeptidase (CPD) is used, it is preferably a serine carboxypeptidase. Serine carboxypeptidases occur in fungi (preferred) and higher plants (K. Breddam, Carlsberg Res. Commun. Vol 51, p 83–128, 1986; S. J. Remington and K. Breddam, Methods Enzymol. 244: 231, 1994). Carboxypeptidase Y present in the vacuoles of baker's yeast is a well-known representative of this category as well as the carboxypeptidases CPD-I and CPD-II, identified in *Aspergillus niger* (Dal Degan, F. et al, Appl. Environ. Microbiol, 58(7): 2144–2152, 1992), and CPD-S1 from *Penicillium janthinellum* (Breddam, K; Carlsberg Res. Commun. 53: 309–320, 1988). Particularly useful serine carboxypeptidases available from plants are carboxypeptidases MI, MII and MIII (K. Breddam et al., Carisberg Res. Comm. 52, 297 (1987). They are present in amongst others barley malt. Carboxypeptidase M from barley malt can easily be obtained in high yields from plants using the method described in WO91/14772.

The use of a serine carboxypeptidase as the single exopeptidase allows hydrolysis under acidic conditions at moderate temperatures. So when a single (only one) serine carboxy peptidase is used in hydrolysing the proteinaceous starting material, the single serine carboxy peptidase provides for at least 75%, preferably at least 90%, more preferably at least 95% of the exopeptidase activity during protein hydrolysis as measured under acidic conditions at moderate temperatures, such as a pH ranging from 4 to 6 and a temperature ranging from 45° C. to 60° C., preferably a pH of 4.5–5.5 at a temperature of 50° C. to 57° C.

If an aminopeptidase is used, it is preferably a heat-stable aminopeptidase. In this context 'heat-stable' is used to indicate that the enzyme's temperature optimum is at a temperature of 60° C. or higher. Heat-stable aminopeptidases have been described for bacteria such as *Bacillus stearothermophilus, Talaromyces duponti* and for Mucor sp. (Roncari, G et al Methods Enzymol. 45: 522, 1976). The obligate thermophilic bacterium *Bacillus stearothermophilus* contains aminopeptidase AP-II, a metal ion dependent, dimeric enzyme with identical sub units (Stoll, E. et al, Biochim. Biophys. Acta 438: 212–220, 1976). The pH optimum of this enzyme is between 7.5 and 8.0 and the temperature optimum well above 60° C. The enzyme closely resembles aminopeptidase T (AP-T) from *Thermus aquaticus*. Even the N-terminal amino sequences of AP-II from *Bacillus stearothermophilus* and AP-T from *Thermus aquaticus* exhibit considerable similarity (Motoshima, H. et al; Agric. Biol. Chem., 54(9), 2385–2392, 1990). No industrial application has been suggested for these enzymes as yet.

The use of a heat-stable aminopeptidase allows hydrolysis under slightly alkaline conditions at a temperature of 60° C. or higher, thus minimising the risk of microbial contamination during hydrolysis. So, when a single (only one) heat-stable aminopeptidase is used in hydrolysing the proteinaceous starting material, the single heat-stable amino peptidase provides for at least 75%, preferably at least 90%, more preferably at least 95% of the exopeptidase activity during protein hydrolysis, as measured under slightly alkaline conditions at a temperature of 60° C. or higher, such as a pH ranging from 7 to 9 and a temperature of at least 60° C., preferably a pH of 7.2 to 8.5 at a temperature of at least 65° C.

Although the scientific literature has adequately described the broad spectrum properties of serine carboxypeptidases under acidic conditions and moderate temperatures, and similar properties of the aminopeptidases APII and AP-T under slightly alkaline conditions and temperatures well above 60° C., industrial use of these exopeptidases to generate pools of free amino acids has not been described.

This is surprising because either lengthy amino acid sequences or complete nucleotide sequences of the cloned corresponding genes for these enzymes are known. Therefore, overexpression and production in suitable production strains could be performed by the person skilled in the art using available recombinant DNA techniques.

Existing enzyme mixtures often contain contaminating enzymes such as e.g. glucosidases. In the method according to the invention substantially pure enzymes are used. This is particularly advantageous in applications where poor taste characteristics are generated by the uncontrolled breakdown of sugars, isoflavoids or saponins.

However, in certain cases the controlled breakdown of compounds other than proteins may be desirable. This may be achieved by adding substantially pure enzymes such as, amylases, glucanases, glutaminases, phytases, glycosidases, cellulases and pectinases to the proteases, or to the proteinaceous material before, after or together with the proteases. Consequently, the total enzyme mixture will depend on the specific application. For example, the enzyme mixture for preparing a flavouring agent, which is typically rich in glutamate, may include glutaminases for the conversion of glutamine (liberated during hydrolysis) into glutamate, in addition to one or more endoproteases and the single exopeptidase.

The following examples will illustrate the invention.

EXAMPLES

Materials and Methods

Finely milled and non-heat treated defatted soy flour (type Cargill 200/80) was obtained from Cargill (Amsterdam, Netherlands).

Wheat gluten was obtained as Biogluten (approx. 80% protein) from Amylum (Aalst, Belgium).

Casein was obtained as Acid Casein (93% protein), whey protein as WPC-80 (approx. 80% protein) from Havero Hoogwegt (Gorinchem, the Netherlands). Chemically deamidated vital wheat gluten type SWP 050 was obtained from Amylum, Aalst, Belgium.

Enzymes were purchased and used directly (Flavourzyme®, Sumizyme® FP, Carboxypeptidase $S_1$ and Carboxypeptidase Y) or first subjected to additional purification procedures (Fromase®, Maxatase®).

Carboxypeptidase CPD-II (Pep F) was obtained from an overproducing *A. niger* strain containing the CPD-II genetic information. Using the CPD-II sequence information as published (J. P. T. W. van den Hombergh et al., Gene 151, 73–79, 1994) the CPD-II gene was obtained and placed under control of the glucoamylase promoter using known techniques. Typical examples of similar constructs used to overproduce phytase and xylanase in *A. niger* have been described in EP 0 420 358 and EP 0463706 respectively. After culturing the overproducing *A. niger* strains for 6 days at 30° C., the culture was centrifuged to remove the cells. Approx. 60–70% of the protein contained in the supernatant represents CPD-II. After ultrafiltration to remove small molecular weight components, the resulting enzyme concentrate was lyophilized and its protein content was determined. Carboxypeptidase CPD-I (Pep G) was isolated as described by F. Dal Degan et al., Appl. Environ. Microbiol., 58 (7), pp. 2144–2152 (1992) and used under the conditions indicated in the Example.

Aminopeptidase II from *Bacillus stearothermophilus* (strain NCIB 8924) was isolated according to the procedure described by Stoll et al. (BBA 438 (1976) 212–220). Purity of the enzyme was tested by gelelectrophoresis under native and denaturing (SDS) conditions. The identity of the enzyme isolated was confirmed by Edman degradation of 9 amino acids of the aminoterminal end of the enzyme. The enzyme was activated by the addition of CoCl2.

Flavourzyme® was obtained from NOVO, Copenhagen, Denmark.

Sumizyme® FP was obtained from Shin Nihon Chemicals Co, Aniyo, Japan. Carboxypeptidase Y and Carboxypeptidase $S_1$ (also known as Carboxypeptidase P (from Penicillium)) were obtained from Sigma, Zwijndrecht, Netherlands.

Fromase® powder 200.000 MCU was obtained from Gist-brocades Seclin, France.

Maxatase® powder 2,16 BYU/kg was obtained from Genencor International, Brughes, Belgium Fromase® and Maxatase® were purified to homogeneity using chromatography over a strong cationic gel type resin (Gibco SP $HG_2$ HR 50/16). Fromase® was applied in 10 mmol/l sodium citrate pH 3.5 and eluted with 25 mmol/l sodium citrate pH 6.0. Maxatase® was applied to the column in 30 mmol/l sodium acetate pH 5.3 and eluted with 100 mmol/l sodium citrate pH 5.8.

Protein contents of the various enzymes were determined using the BCA method of Pierce (Rockford (Ill.) USA) using a temperature of 60° C. and an incubation period of 30 minutes. BSA was used as the protein standard.

Amino acid analysis was carried out according to the Picotag method of Waters (Milford Mass., USA). Total hydrolysis of proteins was achieved by dry hydrolysis over 6N HCl, also according to Waters. Amino acids hydrolysed by enzymatic activity were determined in the supernatant. After incubation, the various samples were immediately centrifuged in an Eppendorf table top centrifuge 5417 at 14.000 rpm for 5 minutes after which the total supernatant was removed and kept frozen at −20° C. Amino acid analysis took place immediately after thawing the sample material.

DH (Degree of Hydrolysis) has been defined as the level of soluble amino acids present in the supernatant divided by the total amino acid content of the supernatant including all proteinaceous material, present in the supernatant.

Example 1

Hydrolysis of Soy Flour using Various Enzyme Mixes

Under pH and temperature conditions feasible for large scale production, a suspension of soy flour in water was incubated with different mixtures of endoprotease and exopeptidases. To allow testing of small quantities of highly purified enzymes under constant pH conditions and complete mixing, the dry matter content of the suspension was limited to 10% (w/w) soy flour in buffer. Enzymes added were standardised on enzyme protein per quantity of soy flour. After incubation, the degree of hydrolysis was determined by comparing the total quantity of solubilized amino acids with the total quantity of amino acids present.

Both Flavourzyme® and Sumizyme® FP are complex mixtures of endoproteases and exopeptidases obtained from Aspergillus species. They have specifically been developed to realize rapid and maximum hydrolysis of various protein sources. Therefore it is not surprising that both Flavourzyme® and Sumizyme® FP are known to contain various endoproteases (e.g. serine endoprotease and neutral protease) in combination with various exopeptidases (e.g. metallo amino peptidase and acid carboxy peptidase). To test the effect of adding only one endoprotease in combination with only one exopeptidase on the kinetics of soy protein hydrolysis, we have contrasted the hydrolysis rates obtained with the commercial protease mixtures Flavourzyme® and Sumizyme® FP with a mixture containing only one endoprotease (i.e. Fromase®) in combination with only one carboxypeptidase [i.e. carboxypeptidase (CPD) Y]. The comparison was performed at a pH of 5.0–5.5 in combination with a temperature of 50–55° C. Similar conditions are suggested for obtaining maximum activity of Flavourzyme®.

The results, presented in Table 1 and Table 2, show the surprising effectiveness of the mixture according to the invention: a mixture of only one purified endoprotease and only one purified carboxypeptidase hydrolyses protein as good as a commercial mixture of enzymes. In addition, the results show that within the limitations set by the total enzyme protein added, the ratio between the purified endoprotease and exopeptidase was not critical.

TABLE 1

| | Level of solubilised amino acids (mmol/liter) obtained with | | | |
|---|---|---|---|---|
| Incubation period (hrs) | Sumizyme ® FP | Flavourzyme ® | Fromase ®/ CPDY 1:10 | Fromase ®/ CPDY 1:3 |
| 0 | 11 | 15 | 14 | 14 |
| 6 | 63 | 81 | 71 | 80 |
| 24 | 85 | 108 | 93 | 96 |

TABLE 2

| | Level of solubilised glutamic acid (mmol/liter) obtained with | | | |
|---|---|---|---|---|
| Incubation period (hrs) | Sumizyme ® FP | Flavourzyme ® | Fromase ®/ CPDY 1:10 | Fromase ®/ CPDY 1:3 |
| 0 | 1.6 | 1.5 | 1.1 | 1.2 |
| 6 | 4.4 | 6.8 | 4.7 | 5.1 |
| 24 | 6.7 | 10.0 | 6.6 | 6.9 |

Conditions: 10% soy flour in 0.25 M sodiumcitrate, pH 5.2 at 55° C.; per mixture 2% enzyme protein on soy flour was added.

Example 2

Effect of Endoproteases on Amino Acid Yield

Since endoprotease treated protein forms the substrate for exoproteolytic attack, it is conceivable that the nature of the endoprotease used directly affects the level of free amino acids generated. As demonstrated in Example 1, changing the ratio between the purified endoprotease and exopeptidase had little effect on the overall yield of solubilised amino acid level. One explanation for this phenomenon could be that the purified Fromase® can generate only a limited number of peptide fragments because of, for example, rather strict amino acid recognition sequences.

To test this explanation, a simple experiment was carried out in which Fromase® was mixed with the purified Maxatase® (within the limits set by the maximum amount of protein tolerated). As Fromase® and Maxatase® prefer different amino acid sequences for cleavage, the mixture of is endoprotease will generate extra soy derived peptide fragments in the incubation mix incorporating carboxypeptidase Y.

Table 3 details the outcome of this experiment and provides the comparison with a commercial mixture of endoprotease and exopeptidases. The results showed that incorporation of another endoprotease has a pronounced stimulating effect on the generation of free aminoacids by carboxypeptidase Y. Therefore, the endoprotease used should be carefully selected, not only in terms of temperature and pH optima, but also in terms of preferred recognition sites.

TABLE 3

| | Protein composition of Incubation Mixture (mg) | | |
|---|---|---|---|
| Enzymes present | A | B | C |
| Fromase ® | 1.0 | 0.5 | — |
| Maxatase ® | — | 0.5 | — |
| CPDY | 3.0 | 3.0 | — |
| Flavourzyme ® | — | — | 4.0 |

| | Soluble amino acid (mmol/l) (Soluble glutamic acid (mmol/l)) | | |
|---|---|---|---|
| Incubation period | | | |
| (55° C., pH 5.2) | A | B | C |
| 0 | 15 (1.2) | 17 (1.5) | 17 (1.8) |
| 6 hrs | 80 (5.1) | 99 (7.2) | 78 (7.1) |
| 24 hrs | 96 (6.9) | 126 (9.7) | 105 (9.5) |

Example 3
Undesirable Enzyme Contaminants

Vegetable protein sources, and soy flour in particular, are cheap starting materials for protein hydrolysates. However, soy flour contains a number of components which could have a negative impact on the taste, colour and nutritional aspects of the final hydrolysate. For example, defatted soy flour contains, in addition to 50% of protein, approximately 13% of polymeric sugars, 13% of oligomeric sugars and 5% of starch. Enzymatic hydrolysis of each of these compounds can lead to appreciable concentrations of highly reactive aldose sugars like glucose, galactose and xylose. In the presence of high concentrations of free amino acids, and catalysed by various processing steps, such sugars may lead to undesirable Maillard products.

Furthermore, isoflavone glycosides, which have been shown to generate bitterness and astringency, are present (e.g. J. Food Sci. 58, 144–147, 1993). An objectionable after-taste is notably generated by the effect of beta-glucosidases which are not only present in the soybean itself but can also exist as a contaminating enzyme activity in the protease mixes used to hydrolyse the soy protein.

To illustrate the potential advantages of using purified (or cloned) enzymes rather than complex protease mixes in hydroiysing soybean protein, we have quantitatively measured some of the non-proteolytic enzyme activities in the enzyme preparations described in Example I.

Methods

The following enzyme activities have been determined:
invertase: able to split sucrose into glucose and fructose and able to convert stacchiose and raffinose into fructose and the reactive manninotriose and meliobiose molecules
alpha-galactosidase: able to release galactose from both stacchiose and raffinose
beta-galactosidase: able to convert genistin into the bitter and astringent tasting aglycone genistein Invertase activity was determined using a relative manual method according to Summer. Details of this procedure are described in Gist-brocades method ISL 60508. (Summer and Sisler, Arch. Biochemistry, vol. 4, p. 333–337, 1944; as modified by Miller, G. L. Analytical Chemistry, vol. 31, No. 3, p. 426–428,1959).

Alpha-galactosidase activity was determined using NOVO method AF 204/2-GB. To facilitate comparison, the pH value of the acetate buffer used was lowered from 5.5 to 5.1; incubation was increased from 15 minutes to 30 minutes. (Alpha-galactosidase activity: Methods of Enzymatic Analysis Vol.II, ed Bergmeyer, H. U. p. 195–197, Verlag Chemie).

Beta-galactosidase activity was determined using a semi-quantitative determination method in which the conversion of genistin into genistein was followed by H-NMR in a Bruker AMX-600. Two mg of genistin was dissolved in 2 ml buffer (0.05 mol/liter acetate pH 5.0) after which 1 mg of enzyme powder was added and incubated at 37° C. for several hours. Samples from this incubation were lyophilized, dissolved in $D_2O$ and compared to reference material incubated without enzyme. The data obtained are summarised in Table 4.

The results showed (in Table 4) that crude enzyme preparations exhibit distinctly higher levels of undesirable enzyme contaminants than their purified versions.

TABLE 4

| Product | Invertase SE/g | alpha-galactosidase GALU/g | Conversion of genistin into genistein |
|---|---|---|---|
| Flavourzyme ® type A | 180 | 1.1 | rapid |
| Sumizyme ® FP | 306 | 53 | rapid |
| Fromase ® pure | <5 | 0.4 | none |
| Maxatase ® pure | <5 | <0.1 | none |
| Carboxypeptidase Y | <5 | <0.1 | none |

Example 4
Performance of Single Serine Carboxypeptides on Other Substrates

In Examples 1–2 it has been demonstrated that in hydrolysing soy flour the type of endoprotease selected plays a role in hydrolysis. Quite surprising was that under the selected industrial incubation conditions, i.e. pH 5–5.5, 55° C., mixtures containing only a single exoprotease could be shown to be superior to multi-enzyme preparations like Flavourzyme® or Sumizyme® FP in terms of amino acid release.

In this Example we will demonstrate that this superiority of single exoprotease incubations is not limited to combinations of carboxypeptidase Y with soy flour. The data provided in Table 5 show that also combinations of vital wheat gluten with carboxypeptidase Y, whey protein with CPD-III and casein with $CPDS_1$ yield superior hydrolysis kinetics. In all of these examples the single exoprotease was combined with Maxatase® to generate the peptides which serve as a substrate for the pure exoproteases.

TABLE 5

| Substrate | Incubation period at 55°°C. pH 5.2 (hrs) | Enzyme Mixture Used Levels of amino acids (mmol/l) solubilised by the enzyme mixture used | | |
|---|---|---|---|---|
| Whey | | Maxatase ® 1.0 mg | Maxatase ® + CPD-II 1.0 mg + 3.0 mg | Flavourzyme ® 4.0 mg |
| | 0 | 4.4 | 24 | 27 |
| | 6 | 13 | 150 | 150 |
| | 24 | 23 | 268 | 240 |
| Casein | | Maxatase ® 1.0 mg | Maxatase ® + $CPDS_1$ 1.0 + 3.0 mg | Flavourzyme ® 4.0 mg |
| | 0 | 3.6 | 51 | 18 |
| | 6 | 10 | 288 | 163 |
| | 24 | 19 | 327 | 257 |

TABLE 5-continued

| Substrate | Incubation period at 55°°C. pH 5.2 (hrs) | Enzyme Mixture Used Levels of amino acids (mmol/l) solubilised by the enzyme mixture used | | |
|---|---|---|---|---|
| Gluten | | Maxatase ® 1.0 mg | Maxatase ® + CPDY 1.0 + 0.8 mg | Flavourzyme ® 1.6 mg |
| | 0 | 1.5 | 24 | 4.9 |
| | 6 | 23 | 260 | 63 |
| | 24 | 38 | 271 | 119 |

Conditions: 10% (w/w) substrate in 0.25 M sodium citrate, pH 5.2 at 55° C.; in incubations incorporating exoproteases, 2% enzyme protein (i.e. 4 mg) on substrate was added except for the example with gluten where 0.8% enzyme protein (i.e. 1.6 mg) on substrate was added.

Example 5
Hydrolysis of Chemically Deamidated Gluten Protein

Apart from soy flour, wheat gluten represents an economically attractive source of amino acids. Wheat gluten is known to be exceptionally rich in glutamine containing stretches so that enzymatic hydrolysis of gluten can be expected to yield relatively large quantities of free glutamine, which is a desirable precursor of glutamic acid. Both the enzymatic and chemical conversion of glutamines released by enzymatic hydrolysis into glutamic acid and hence MSG, has been adequately described in the literature.

The enzymatic hydrolysis of chemically deamidated wheat gluten is a less obvious route to obtain aminoacid pools rich in glutamate. One reason for this is that stretches of aminoacids rich in glutamic or aspartic acid are notoriously difficult to hydrolyse by most exoproteases. Therefore, one would expect low glutamate yields upon enzymatic hydrolysis of chemically deamidated gluten.

To test this hypothesis, a sample of commercially available SWP 050 obtained from Amylum, Aalst/Belgium (chemically deamidated wheat gluten) was incubated with Flavourzyme®, Maxatase® and with a mixture of Maxatase® and pure Carboxypeptidase I (CPD-II) after which the level of soluble aminoacids and glutamate was determined.

As shown in Table 6 the mixture incorporating the purified CPD-I enzyme was superior over the Flavourzyme®-mixture in releasing giutamic acid from the chemically deamidated gluten.

TABLE 6

| Incubation period at 55° C., pH 5.2 (hrs) | Level of solubilised amino acid (mmol/l) (level of solubilised glutamic acid (mmol/l) | | |
|---|---|---|---|
| | Maxatase ® 1.0 mg | Maxatase ®/CPD-II 1.0 + 0.6 mg | Flavourzyme ® 1.6 mg |
| 0 | 0.7 (0) | 24 (3.5) | 8.4 (1.1) |
| 6 | 1.4 (0) | 94 (10.6) | 62 (3.1) |
| 24 | 2.2 (0) | 111 (13.0) | 114 (6.5) |

Conditions: 10% w/w SWP 050 in 0.25 M sodium citrate, pH 5.2 at 55° C.; per mixture containing exoproteolytic activity, 0.8 w/w % enzyme protein on SWP 050 was added.

Example 6
Hydrolysis of Soy Flour using Heat-stable Enzyme

Whilst serine carboxypeptidase enzymes show maximum activity towards complete hydrolysis of peptides at acid pH values (K. Breddam, Carlsberg Res. Commun. Vol. 51, p. 83–128, 1986) and temperatures below 60° C., heat-stable aminopeptidases are optimally active at slightly alkaline conditions and temperatures well above 60° C. Like the combination of acid pH values with a temperature higher than 50° C., the combination of a neutral pH value with a temperature well above 60° C. is unfavourable to the growth of any toxin producing microorganisms. As such heat stable aminopeptidases are also ideally suited for enzyme incubations under industrial (i.e. non-sterile) conditions.

To test the performance of a heat stable aminopeptidase in terms of releasing amino-acids, chromatographically pure AP II enzyme was incubated with purified Maxatase® and defatted soy flour at 70° C. and pH 7.4. The results of the experiments obtained with AP II shown in Table 7 clearly demonstrate that under the high temperature conditions applied the performance of the single exoprotease is superior to the complex mixture of exoproteases present in a commercial preparation.

TABLE 7

| | Protein composition of Incubation Mixture (mg) | | | |
|---|---|---|---|---|
| Enzymes present | A | B | C | D |
| Maxatase ® | — | 1 | 1 | — |
| AP II | — | — | 3 | — |
| Flavourzyme ® | — | — | — | 4 |
| | Soluble amino acid (mmol/l) | | | |
| Incubation period (hrs) | A | B | C | D |
| 0 | 9.6 | 73 | 8.1 | 17 |
| 6 | 4.7 | 6.6 | 79 | 17 |
| 24 | 2.4 | 6.5 | 75 | 58 |

Conditions: 10% w/w soy flour in 0.25 M sodium phosphate, pH 7.4 at 70° C.; per mixture incorporating exoproteolytic activity 2% enzyme protein (i.e. 4 mg) on soy flour was added.

What is claimed is:

1. A method for preparing a protein hydrolysate from a proteinaceous material which method comprises contacting said material under aqueous conditions with a proteolytic enzyme mixture which comprises at least one endopeptidase and to which has been added a single pure exopeptidase.

2. A method according to claim 1, wherein said exopeptidase has been produced using rDNA techniques.

3. A method according to claim 1 or 2, wherein the exopeptidase is a carboxypeptidase.

4. A method according to claim 3, wherein the carboxypeptidase is a serine carboxypeptidase.

5. A method according to claim 3, wherein the carboxypeptidase is obtainable from a fungus or a plant.

6. A method according to claim 3, wherein the carboxypeptidase is carboxypeptidase Y, CPD-I, CPD-II, carboxypeptidase S1 or carboxypeptidase MI, MII or MIII.

7. A method according to claim 1 wherein the hydrolysis is performed at a temperature of at least 45° C.

8. A method according to claim 1, wherein the exopeptidase is a heat-stable exopeptidase.

9. A method according to claim 1, wherein the exopeptidase is an aminopeptidase.

10. A method according to claim 9, wherein the aminopeptidase is obtainable from a bacterium.

11. A method according to claim 10, wherein the bacterium is a Bacillus species.

12. A method according to claim 10 wherein the bacterium is a Thermus species.

13. A method according to claim 10, wherein the aminopeptidase is APII from *B. stearothermophilus* or AP-T from *T. aquaticus*.

14. A method according to claim 8 wherein the hydrolysis is performed at a temperature of at least 60° C.

15. A method according to claim 14 wherein the hydrolysis is performed at a temperature of at least 65° C.

16. A method according to claim 1, wherein the hydrolysis is performed at a pH in the range of 4.5 to 9.

17. A method according to claim 1, wherein the proteinaceous material is a vegetable protein.

18. A method according to claim 17 wherein the vegetable protein is defatted soy flour or optionally deamidated wheat gluten.

19. A method according to claim 1, wherein the enzyme mixture contains only one endoprotease.

20. A method according to claim 1 wherein the proteinaceous material is contacted with at least one amylase, glucanase, glutaminase, phytase, glycosidase, cellulose or pectinase before, after or together with the proteolytic enzyme mixture.

21. A method according to claim 1 wherein said proteolytic enzyme mixture is substantially free from glycosidase activity or invertase activity, or amylase activity, or glucanase activity, or glutaminase activity, or phytase activity, or cellulase activity or pectinase activity.

22. A protein hydrolysate obtainable by the methods of 21.

23. A food product containing a protein hydrolysate according to claim 22.

24. A process for preparing a food product comprising (i) preparing a protein hydrolysate according to claim 22 and (ii) formulating a food product using the hydrolysate.

* * * * *